United States Patent
Lee et al.

(10) Patent No.: US 8,884,182 B2
(45) Date of Patent: Nov. 11, 2014

(54) METHOD OF MODIFYING THE END WALL CONTOUR IN A TURBINE USING LASER CONSOLIDATION AND THE TURBINES DERIVED THEREFROM

(75) Inventors: Ching-Pang Lee, Cincinnati, OH (US); Hsin-Pang Wang, Rexford, NY (US); Ronald Scott Bunker, Niskayuna, NY (US); Sudhir Kumar Tewari, West Chester, OH (US); Magdi Naim Azer, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1553 days.

(21) Appl. No.: 11/609,150

(22) Filed: Dec. 11, 2006

(65) Prior Publication Data

US 2008/0135530 A1  Jun. 12, 2008

(51) Int. Cl.
| | | |
|---|---|---|
| B23K 26/00 | (2014.01) | |
| B23P 6/00 | (2006.01) | |
| B64C 11/00 | (2006.01) | |
| F01D 5/20 | (2006.01) | |
| B22F 5/00 | (2006.01) | |
| C23C 24/10 | (2006.01) | |
| B22F 3/105 | (2006.01) | |
| F01D 5/14 | (2006.01) | |
| C23C 26/02 | (2006.01) | |
| B22F 5/04 | (2006.01) | |

(52) U.S. Cl.
CPC ............... F01D 5/145 (2013.01); B22F 5/009 (2013.01); C05D 2230/30 (2013.01); C23C 24/10 (2013.01); B22F 3/1055 (2013.01); F05D 2270/17 (2013.01); F05D 2230/50 (2013.01); F05D 2230/234 (2013.01); C23C 26/02 (2013.01); B22F 5/04 (2013.01)

USPC .............. 219/121.64; 219/121.6; 219/121.66; 219/121.85; 29/888.021; 29/889.1; 29/889.7; 29/889.71; 29/402.18; 416/1; 416/193 A; 416/223 R; 416/241 B; 416/223 A; 415/173.1; 415/191

(58) Field of Classification Search
CPC .... B23K 26/0087; B23K 26/38; B22F 3/1055
USPC ................. 29/888.021, 889.1, 889.7, 889.71, 29/889.72, 402.18; 219/121.64, 121.6, 219/121.66, 121.85; 416/1, 193 A, 223 R, 416/241 B, 223 A; 415/173.1, 191
See application file for complete search history.

(56) References Cited

U.S. PATENT DOCUMENTS

| | | |
|---|---|---|
| 3,220,972 A | 11/1965 | Lamoreaux |
| 3,516,946 A | 6/1970 | Modic |

(Continued)

OTHER PUBLICATIONS

Harvey et al; Non-Axisymmetric Turbine End Wall Design: Part 1 Three-Dimensional Linear Design System; ASME Paper; 99-GT-337; Presented at the International Gas Turbine & Aeroengine Congress & Exhibition, Indianapolis, Indiana; 8 pages; Jun. 7-Jun. 10, (1999).

(Continued)

*Primary Examiner* — Dana Ross
*Assistant Examiner* — Ket D Dang
(74) *Attorney, Agent, or Firm* — John P. Darling (57) ABSTRACT

A method of modifying an end wall contour is provided. The method includes creating a weld pool using a laser, adding a metal or a ceramic powder or a wire filler to the melt pool and modifying the part of the turbine in a manner that results in a change of about 0.005 to about 50 volume percent in the part of the turbine. The weld pool is created on a turbine component and contains molten metal or ceramic derived as a result of a heat interaction between the laser and the turbine component.

17 Claims, 4 Drawing Sheets

(56) References Cited

U.S. PATENT DOCUMENTS

| | | | |
|---|---|---|---|
| 3,715,334 A | | 2/1973 | Karstedt |
| 3,775,452 A | | 11/1973 | Karstedt |
| 4,288,345 A | | 9/1981 | Ashby et al. |
| 4,323,756 A | | 4/1982 | Brown et al. |
| 4,359,310 A | * | 11/1982 | Endres et al. ............ 415/115 |
| 4,421,903 A | | 12/1983 | Ashby |
| 4,724,299 A | | 2/1988 | Hammeke |
| 4,730,093 A | | 3/1988 | Mehta et al. |
| 5,014,763 A | | 5/1991 | Frank |
| 5,038,014 A | | 8/1991 | Pratt et al. |
| 5,043,548 A | | 8/1991 | Whitney et al. |
| 5,337,568 A | | 8/1994 | Lee et al. |
| 5,397,215 A | | 3/1995 | Spear et al. |
| 5,601,737 A | * | 2/1997 | Asahi et al. ............ 219/121.66 |
| 5,811,907 A | * | 9/1998 | Fukuda et al. ......... 310/216.073 |
| 5,931,638 A | | 8/1999 | Krause et al. |
| 6,017,186 A | | 1/2000 | Hoeger et al. |
| 6,109,869 A | * | 8/2000 | Maddaus et al. ............ 415/191 |
| 6,171,058 B1 | * | 1/2001 | Stec ..................... 416/193 A |
| 6,254,334 B1 | | 7/2001 | LaFleur |
| 6,269,540 B1 | * | 8/2001 | Islam et al. ............ 29/889.7 |
| 6,283,713 B1 | | 9/2001 | Harvey et al. |
| 6,338,609 B1 | | 1/2002 | Decker et al. |
| 6,379,528 B1 | | 4/2002 | Lee et al. |
| 6,402,464 B1 | | 6/2002 | Chiu et al. |
| 6,419,446 B1 | | 7/2002 | Kvasnak et al. |
| 6,429,402 B1 | | 8/2002 | Dixon et al. |
| 6,502,622 B2 | | 1/2003 | Lee et al. |
| 6,504,127 B1 | | 1/2003 | McGregor et al. |
| 6,511,294 B1 | | 1/2003 | Mielke et al. |
| 6,546,730 B2 | | 4/2003 | Johnson et al. |
| 6,561,761 B1 | | 5/2003 | Decker et al. |
| 6,598,781 B2 | * | 7/2003 | Hasz et al. .................. 228/245 |
| 6,626,230 B1 | | 9/2003 | Woodrum et al. |
| 6,669,445 B2 | | 12/2003 | Staubach et al. |
| 6,733,907 B2 | * | 5/2004 | Morrison et al. ............ 428/699 |
| 6,935,770 B2 | * | 8/2005 | Schueler .................. 366/174.1 |
| 6,974,308 B2 | | 12/2005 | Halfmann et al. |
| 6,989,506 B2 | * | 1/2006 | Yabu ..................... 219/121.64 |
| 7,097,429 B2 | * | 8/2006 | Athans et al. ............ 416/193 A |
| 7,134,842 B2 | | 11/2006 | Tam et al. |
| 2005/0006047 A1 | | 1/2005 | Wang et al. |
| 2005/0069407 A1 | * | 3/2005 | Winkler et al. ............ 415/58.5 |
| 2005/0070651 A1 | | 3/2005 | McNulty et al. |
| 2005/0156361 A1 | | 7/2005 | Holowczak et al. |
| 2005/0205232 A1 | | 9/2005 | Wang et al. |
| 2006/0065383 A1 | | 3/2006 | Ortiz et al. |
| 2006/0120851 A1 | * | 6/2006 | Boeck ............................ 415/14 |
| 2006/0140768 A1 | * | 6/2006 | Tam et al. ................. 416/193 A |
| 2006/0153681 A1 | | 7/2006 | Lee |
| 2006/0233641 A1 | | 10/2006 | Lee et al. |
| 2006/0275112 A1 | | 12/2006 | Lee et al. |
| 2007/0003416 A1 | * | 1/2007 | Bewlay et al. ............ 416/241 B |
| 2007/0160476 A1 | * | 7/2007 | Cheng et al. ............ 416/193 A |

OTHER PUBLICATIONS

Krauss et al; "Rheological Properties of Alumina Injection Feedstocks"; Materials Research; 8; pp. 187-189; (2005).

Sieverding; "Secondary Flows in Straight and Annular Turbine Cascades"; in Thermodynamics and Fluid Mechanics of Turbomachinery, vol. II; Eds. A.S. Ucer, P. Stow, and Ch. Hirsch; NATO ASI Series; Martinus Nijhoff Publishers; pp. 621-664; (1985).

Shih et al; "Controlling Secondary-Flow Structure by Leading-Edge Airfoil Fillet and Inlet Swirl to Reduce Aerodynamic Loss and Surface Heat Transfer"; Transactions of the ASME; 125; pp. 48-56; Jan. (2003).

Takeishi et al; "An Experimental Study of the Heat Transfer and Film Cooling on Low Aspect Ratio Turbine Nozzles"; The American Society of Mechanical Engineers, 345 E. 47$^{th}$ St., New York, N.Y. 10017; ASME Paper 89-GT-187; Presented at the Gas Turbine and Aeroengine Congress and Exposition, Jun. 4-8, Toronto, Ontario Canada; 9 pages. (1989).

Theiler, et al.; "Deposition of Graded Metal Matrix Composites by Laser Beam Cladding"; BIAS Bremen Institute of Applied Beam Technology, Germany; http://www.bias.de/WM/Publikationen/Deposition%20of%20graded.pdf; 10 pages.; Jun. 2005.

U.S. Appl. No. 11/256,823, filed Oct. 24, 2005; "Ceramic-Based Molds for Industrial Gas Turbine Metal Castings Using Gelcasting"; Huang et al.

U.S. Appl. No. 11/540,741, filed Sep. 29, 2006; "Turbine Angel Wing Sealing Using Surface Depression Treatment"; Bunker, Ronald Scott.

U.S. Appl. No. 11/240,837, filed Sep. 30, 2006; "Methods for Making Ceramic Casting Cores and Related Articles and Processes"; H.P. Wang et al.

U.S. Appl. No. 11/567,409, filed Dec. 6, 2006; "Casting Compositions for Manufacturing Metal Castings and Methods of Manufacturing Thereof"; Hsin-Pang Wang et al.

U.S. Appl. No. 11/567,443, filed Dec. 6, 2006; "Disposable Insert, and Use Thereof in a Method for Manufacturing an Airfoil"; Ching-Pang Lee.

U.S. Appl. No. 11/567,477, filed Dec. 6, 2006; "Composite Core Die, Methods of Manufacture Thereof and Articles Manufactured Therefrom"; Ching-Pang Lee et al.

U.S. Appl. No. 11/567,521, filed Dec. 6, 2006; "Ceramic Cores, Methods of Manufacture Thereof and Articles Manufactured From the Same"; Chin-Pang Lee.

U.S. Appl. No. 11/635,749, filed Dec. 7, 2006; "Processes for the Formation of Positive Features on Shroud Components, and Related Articles"; Ching-Pang Lee.

U.S. Appl. No. 11/609,117, filed Dec. 11, 2006; "Disposable Thin Wall Core Die, Methods of Manufacture Thereof and Articles Manufactured Therefrom"; Hsin-Pang Wang et al.

\* cited by examiner

Laser Consolidation Process

METHOD OF MODIFYING THE END WALL CONTOUR IN A TURBINE USING LASER CONSOLIDATION AND THE TURBINES DERIVED THEREFROM

BACKGROUND

This disclosure relates to a method of modifying the end wall contour in a turbine using laser consolidation. It also relates to the turbine blades derived therefrom.

A turbine system generally comprises stationary vanes and blades rotating about the central axis. Each row of airfoil members divides the annulus of the gas path into a series of sectoral passages, each bounded by the opposed suction and pressure surfaces of an adjacent pair of airfoils and the radially inner and outer walls of the endwall. The inner endwall connected to the rotating blade airfoil root is also termed a platform. The flow field within the sectoral passages is complex and includes a number of secondary vertical flows that act as major sources of energy loss. Reference can be made to Sieverding (1985) "Secondary Flows in Straight and Annular Turbine Cascades", Thermodynamics and Fluids of Turbomachinery, NATO, Vol. 11, pp 621-624 for a detailed discussion of these flows. The relative importance of these secondary flows increases with the increase of aerodynamic duty or decrease of aspect ratio of the blades. Not only is there energy dissipation in the secondary flows themselves, but they can also affect adversely the fluid flow downstream because they cause deviations to the exit angles of the flow from the rows of airfoil members.

Figure 1:
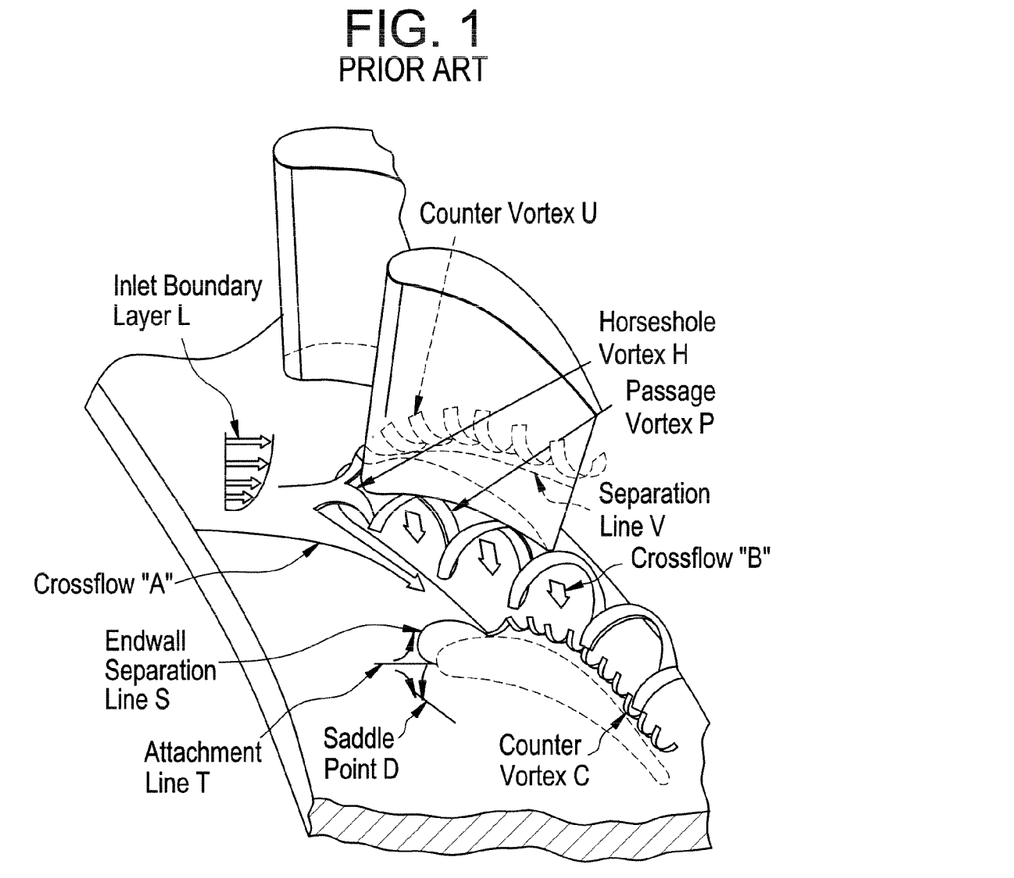
FIG. 1 is an exemplary depiction of a platform with a turbine blade disposed thereon. The figure reflects the formation of secondary vortices along the platform.

It is found that it is the endwall boundary layers (also known as the end wall contours) that give rise to a substantial part of these secondary flows. FIG. 1 shows a flow model illustration taken from Takeishi et al (1989), "An Experimental Study of the Heat Transfer and Film Cooling on Low Aspect Ratio Turbine Nozzles", ASME Paper 89-GT-187. This shows part of a row of turbine blades projecting from a cylindrical surface that forms a radially inner endwall of the annular passage from which the blade airfoil extends. The principal flow features as shown in the model in the FIG. 1 are (i) rolling up of the inlet boundary layer L into a horseshoe vortex H at the blade leading edge due to a pressure variation at the intersection of the leading edge and the endwall. The pressure surface side leg of this flow becomes the core of a passage vortex P that is a dominant part of the secondary flow. On the endwall beneath the passage vortex a new boundary layer is formed, indicated as cross-flow B, which starts in the pressure side corner of the endwall of the blade passage. (ii) Upstream of the crossflow B, the inlet boundary layer is deflected across the passage, as indicated by crossflow A. The endwall separation line S marks the furthest penetration of the bottom of the inlet boundary layer A into the blade passage and divides it from the new boundary layer (crossflow B) forming downstream of it. (iii) The new endwall boundary layer, crossflow B, continues onto the blade suction surface until it separates, along an airfoil separation line V, and feeds into the passage vortex P. The horseshoe vortex suction side leg, referred to as the counter vortex U in the FIG. 1, remains above the passage vortex P and moves away from the endwall as the passage vortex grows. (iv) A small counter vortex C may be initiated in the corner region between the blade suction surface and the endwall, rotating in the opposite sense to the passage vortex. (v) Also illustrated in FIG. 1 are the attachment line T which represents the division of the incoming boundary layer flow L between adjacent passages, and the saddle point D, where the attachment line T and the endwall separation line S intersect.

In general, the passage vortex will increase the exit angle of the flow at the endwall (referred to as "over turning") with the compensatory reduction in exit angle away from the wall (referred to as "under turing"). These effects give rise to deviations of the inlet flow to the next airfoil row, causing the angle of incidence of the flow on the airfoils to vary positively or negatively from the design value and so reduce the aerodynamic efficiency of the flow. They also promote surface heating which is undesirable. Surface heating leads to higher temperatures at the surface.

It is therefore desirable to modify the endwall contour of turbine blades so as to minimize these secondary flows and to improve aerodynamic efficiency as well as to reduce heating to the platform and the blades. A number of publications disclose newer end-wall designs that minimize the formation of these secondary flows to improve the aerodynamic efficiency of the turbine rotor. These newer designs however, require the end-wall modification to be made during the casting process for the blades prior to the assembly of the new blades with the platform. Meeting these design requirements during the casting process is difficult and expensive. For example, the fillet radius between the blade and the platform is generally only sized to meet the minimum requirements set by the casting. Further modifications are often desirable after the casting process in order to accomplish end wall contour modifications.

It is therefore desirable to have a process that facilitates modification of the existing turbine blades that do not contain the aforementioned end-wall modifications. It is also desirable to have a process that facilitates modification of the existing turbine blades that are not hitherto cast to desired specifications. The process can be advantageously used to modify existing blades that are already in service.

SUMMARY

Disclosed herein is a method comprising creating a weld pool using a laser; wherein the weld pool is created on a part of a turbine; and wherein the weld pool comprises molten metal or ceramic derived as a result of a heat interaction between the laser and the part of the turbine; adding a metal or a ceramic powder or a wire filler to the melt pool; and modifying the part of the turbine in a manner that results in a change of about 0.005 to about 50 volume percent in the part of the turbine, while improving the aerodynamic efficiency of the turbine in an amount of about 0.1 to about 5 percent over a corresponding unmodified turbine.

DETAILED DESCRIPTION OF FIGURES

DETAILED DESCRIPTION

The use of the terms "a" and "an" and "the" and similar references in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Disclosed herein is a method that comprises modifying the turbine rotor or stator by creating a weld pool using a laser; wherein the weld pool is created on a turbine rotor or stator; and wherein the weld pool comprises molten metal or ceramic derived as a result of a heat interaction between the laser and the turbine rotor or stator. The method comprises adding a metal or a ceramic powder or a wire filler to the melt pool and modifying the turbine rotor or stator in a manner that is effective to produce an improvement in aerodynamic efficiency over a turbine rotor or stator that does have the modification.

More specifically, disclosed herein is a method for modifying the endwall contour of turbine blades that are already in service. The method advantageously comprises utilizing laser consolidation to change the endwall contour of turbine blades to control, reduce and/or eliminate the secondary airflows. This reduction in the secondary airflows in a turbine rotor promotes an increase in aerodynamic efficiency and further reduces the heating that occurs on the platform. The addition of materials to the blade by laser consolidation may also be applied to vary the surface roughness elements on the blade. In one embodiment, a modification of a turbine rotor (using laser consolidation) can be performed in order to promote the optimization of energy extraction from the fluid stream. In another embodiment, a modification of a turbine rotor can be performed in order to promote the maximization of energy extraction from the fluid stream.

As noted above, the endwall contours between the turbine blade and platform may be modified using laser consolidation. In a similar manner, the inner band and/or the outer band of a turbine stator can be modified using laser consolidation. Other turbine components such as turbine rotors or stators, shrouds, splitters, compressor rotors or stators, fans, exhaust nozzles, shrouds, or the like, or a combination comprising at least one of the foregoing parts of the turbine can also be modified via laser consolidation.

In an exemplary embodiment, the endwall modification can be formed on turbine blades and platforms that are already in service and that were originally manufactured according to different specifications. These different specifications give rise to secondary flows that are detrimental to turbine efficiency. The method advantageously comprises utilizing laser consolidation to change the endwall contour of turbine blades and platforms to control, reduce and/or eliminate secondary airflows. This reduction or elimination in the secondary airflow in a turbine stator or rotor promotes an increase in aerodynamic efficiency and further reduces the surface heating that occurs on the platform and the blade root. In other words, the modification leads to lower temperatures at the surface.

The laser consolidation may be used to modify the platform and the blade root to create a desirable endwall contour for improving the aerodynamic performance and reducing heating to the blade platform and airfoil. The laser consolidation may also be applied to form surface roughness elements on the blade surface if desired. Such surface roughness elements can be used to disrupt and eliminate secondary flows.

Figure 2:
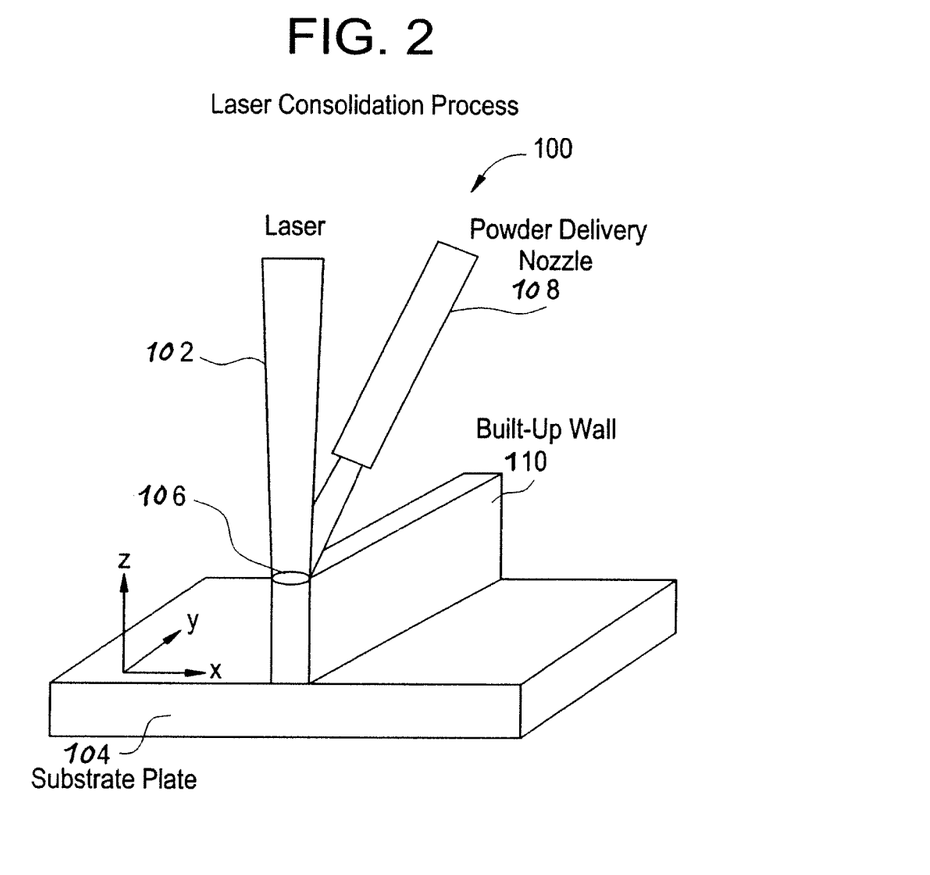
FIG. 2 is an exemplary schematic depiction of a laser consolidation process as applied to modify an exemplary end wall contour.

With reference now to the exemplary FIG. 2, a laser consolidation device 100 comprises a device (e.g., laser beam) 102 for producing and focusing a laser beam on a substrate plate (e.g., turbine blade root) 104 to form a weld pool 106 on a turbine wall 110. The laser can operate at ultraviolet, visible, and/or infrared wavelengths of the electromagnetic spectrum. The weld pool is created by melting a portion of the turbine platform or the turbine blade root as a result of their interaction with the laser. While the Figure depicts the weld pool 106 on the turbine wall 110, it is to be noted that the weld pool may be formed on any desired part of a turbine and the laser consolidated on any portion of the turbine.

At the same time, as shown in the FIG. 2, either a metal powder or wire filler 108 of the desired alloy composition is introduced into the weld pool thereby producing a deposit of material on the turbine platform or the turbine blade root 104. By scanning the laser beam 102 and the powder 108, appropriate geometric features can be disposed upon the turbine platform and/or the turbine blade root 104.

Endwall contour modification is described in the following U.S. Patents, which are incorporated herein by reference: U.S. Pat. No. 6,669,445 (Staubach et al.); U.S. Pat. No. 6,561,761 (Decker et al.); U.S. Pat. No. 6,511,294 (Mielke et al.); U.S. Pat. No. 6,419,446 (Kvasnak et al.); U.S. Pat. No. 6,338,609 (Decker et al.); U.S. Pat. No. 6,283,713 (Harvey et al.); U.S. Pat. No. 6,017,186 (Hoeger et al.); U.S. Pat. No. 5,397,215 (Spear et al.). Endwall contour modification is also described in the following: U.S. Pat. No. 7,217,096, U.S. Pat. No. 7,134,842, U.S. Pat. No. 7,371,046, U.S. Pat. No. 7,249,933 and U.S. Pat. No. 7,220,100, the contents of which are also incorporated herein by reference.

Laser consolidation is also termed "laser cladding", "laser welding", "laser engineered net shaping", and the like. ("Laser consolidation" or "laser deposition" will usually be the terms used herein). Non-limiting examples of the process are provided in the following U.S. Patents, which are incorporated herein by reference: U.S. Pat. No. 6,429,402 (Dixon et al.); U.S. Pat. No. 6,269,540 (Islam et al); U.S. Pat. No. 5,043,548 (Whitney et al.); U.S. Pat. No. 5,038,014 (Pratt et al); U.S. Pat. No. 4,730,093 (Mehta et al.); U.S. Pat. No. 4,724,299 (Hammeke); and U.S. Pat. No. 4,323,756 (Brown et al.). The equipment and processes used for laser consolidation are described in detail in U.S. application Ser. No. 11/240,837 (now abandoned) and U.S. 2007/0003416A1, the entire contents of which are hereby incorporated by reference.

As noted above, laser consolidation processes 100 involves the feeding of a consumable powder or wire 108 into a melt pool 106 on the surface of a turbine platform and/or the turbine blade root 104 to manufacture a built-up wall 110. The turbine platform or the turbine blade root 104 is usually a substrate portion that is to be modified by the process. The melt pool is generated and maintained through the interaction with the laser beam, which provides a high-intensity heat source. The turbine platform or the turbine blade root 104 is scanned relative to the beam. As the scanning progresses, the melted substrate region and the melted deposition material solidify, and a clad track is deposited on the surface. A layer is successively formed by depositing successive tracks side-by-side. Multilayer structures are generated by depositing multiple tracks on top of each other.

Ceramic materials used in the laser consolidation method are generally in powder form. In general, any ceramic material can be used on the turbine platform or the turbine blade root to facilitate the end wall contour modification. It is generally desirable to use ceramics that can be removed with a suitable leaching material. Precursors to the desired ceramic materials could also be used. Examples of suitable ceramic powders include alumina, zirconia, silica, yttria, magnesia, calcia, ceria, or the like, or a combination comprising at least one of the foregoing ceramic powders. Alumina and alumina-containing mixtures are often the preferred ceramic materials for laser consolidation. The ceramic material may also include a variety of other additives, such as binders. The powder size of the ceramic material will depend in large part on the type of powder, and the type of laser deposition apparatus.

Metals may also be used in the endwall contour modification. Examples of suitable metals are generally superalloys. Examples of such superalloys are cobalt based alloys, nickel based alloys, titanium based alloys, iron based alloys, HASTALLOY®, INCONEL®, HAYNES® alloys, MP98T®, TMS alloy, CMSX® single crystal alloys or combination comprising at least one of the foregoing alloys. The powder size of the metals will depend in large part on the type of powder, and the type of laser deposition apparatus.

Figure 3:
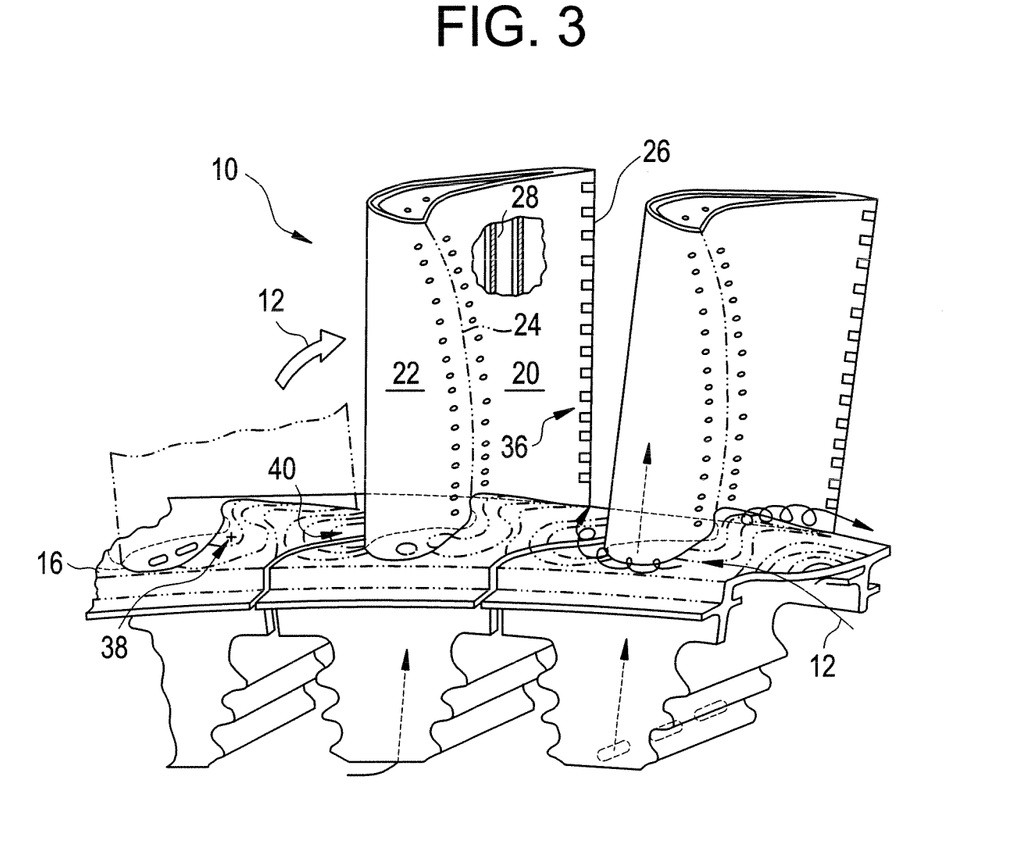
FIG. 3 is an exemplary turbine blade platform with non-axisymmetric endwall contouring.
Figure 4:
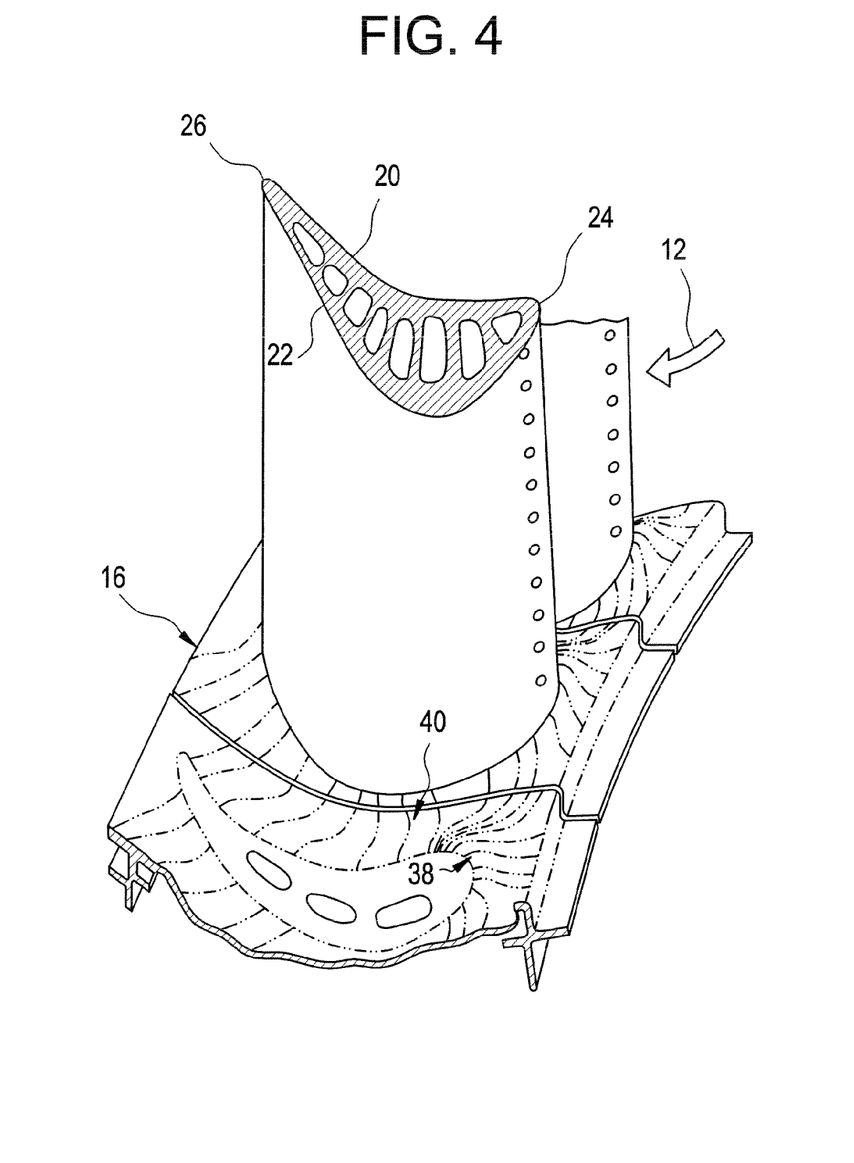
FIG. 4 is another exemplary view of platform elevation for a turbine blade with endwall contouring.

An exemplary use of laser consolidation is demonstrated in the FIGS. 3 and 4. FIG. 3 depicts an exemplary turbine section 10 with non-axisymmetric endwall contouring, while FIG. 4 is another exemplary isometric view of platform elevation for a cross-section of the turbine blade with endwall contouring. FIG. 3 depicts an exemplary turbine rotor stage (similar to that illustrated in FIG. 1) and may have any suitable configuration such as that designed as a first stage high pressure turbine (WPT) rotor for extracting energy from the combustion gases to power the compressor. As indicated above, the incident combustion gases 12 are split along the airfoil leading edges 24 to flow axially through the corresponding flow passages 36 in the downstream direction.

The concave profile of the pressure sides 20 and the convex profile of the suction sides 22 are specifically configured for effecting different velocity and pressure distributions for maximizing extraction of energy from the combustion gases. The turbine platforms 16 define radially inner endwalls, which serve as boundaries for the combustion gases, with the gases also being bound radially outwardly by a surrounding turbine shroud (not shown).

In this configuration, the incident combustion gases at the junction of the platforms and leading edges is subject to the horseshoe vortices which progress through the flow passages along the opposite pressure and suction sides of the airfoils. As indicated above, these vortices create turbulence, decrease the aerodynamic efficiency of the turbine stage, and increase the heat transfer heating of the platforms.

Accordingly, the turbine platforms illustrated initially in the FIG. 1 are specifically configured with scalloped flow surfaces that serve as boundaries for the combustion gases in order to mitigate the strength of the horseshoe vortices. An exemplary configuration of the scalloped platforms is shown generally in FIG. 3 with isoclines of common elevation from a nominally axisymmetric platform.

Modern computational fluid dynamics have been used to study and define the specific 3D contours of the platforms for weakening the horseshoe vortices and correspondingly improving turbine efficiency. The scalloped platforms illustrated in the FIG. 3 includes a local bump or bulge 38 rising upwardly (+) into the flow passage 36 relative to the nominal axisymmetric reference surface of a conventional platform that defines the reference zero surface. Cooperating with the local bulge 38 is an integral gouge or bowl 40 that has a lower elevation (−) relative to the nominal axisymmetric platform surface to form a depression therein.

FIG. 4 shows that the bulge 38 therefore rises outwardly in elevation (+) from the zero reference plane or surface, whereas the bowl 40 extends in depth (−) below the reference plane or surface. In this way, the bulge 38 and bowl 40 may complement and offset each other for maintaining the desired or given flow area for each flow passage.

The bulges and bowls illustrated in the FIGS. 3 and 4 are preferentially located specifically for reducing the strength of the horseshoe vortices and improving turbine efficiency. The bulge 38 directly adjoins the airfoil pressure side 20 adjacent to the leading edge 24. And, the bowl 40 directly adjoins the airfoil suction side 22 aft of the leading edge 24.

By using the leading edge bulge, the incoming horseshoe vortices can be offset by local streamline curvature of the combustion gases around the bulge 38. Correspondingly, the radially outward migration of the horseshoe vortices can be interrupted early in the flow passage by the bowl 40.

In one embodiment, the bulge 38 may be deposited on the turbine platform 16 via laser consolidation as explained above. The bulge 38 may have a regular geometry and/or an irregular geometry. A regular geometry is a structure that has a surface that comprises elements or sections of elements that can be mathematically defined via Euclidean geometry, while an irregular geometry is that having a surface that comprises elements or sections of elements that can be mathematically defined via non-Euclidean geometry. In one embodiment, the bulge 38 may have a cross-section that is substantially circular, substantially triangular, substantially square, substantially rectangular or substantially polygonal.

In one embodiment, the bulge 38 is measured by its average outward rise in elevation (+) from the zero reference plane or surface. Thus a bulge 38 can also encompass a bowl 40 so long as the average rise in elevation for the protuberance is positive. In a similar manner, a bowl 40 is measured by the extent in depth (−) below the reference plane or surface. Thus a bowl 40 can encompass a bulge so long as the average depth is negative.

Thus the bulge 38 can be spherical, hemispherical or inverted hemispherical, cylindrical, inverted cylindrical, tubular, conical, inverted conical, cuboidal, inverted cuboidal, ellipsoidal, inverted ellipsoidal, platelet-like, or a combination comprising at least one of the foregoing geometries.

Laser consolidation can thus be used to texture the parts of turbine. Texturing generally comprises the formation of periodic structures on the part of the turbine that is to be modified. For example, a plurality of bulges can be manufactured on the surface of a turbine rotor or stator. The plurality of bulges can have a periodicity of about 10 micrometers to about 100 millimeters or more if desired. Examples of texturizing are riblets on endwalls, dimples on shrouds, or the like. Various types of dimples on shrouds or riblets on endwalls are described in U.S. 2008/0080972 A1 as well as U.S. Pat. No. 5,337,568 to Lee et al., the entire contents of which are hereby incorporated by reference. In another embodiment, the laser consolidation can be used to produce aperiodic structures on a part of the turbine.

As noted above, laser consolidation can be used to produce surface roughness. Surface roughness generally comprises small-scale variations in the height of a physical surface. In one embodiment, laser consolidation can be used to produce surface roughness of the order of about 0.5 micrometers to about 500 micrometers.

In one embodiment, after laser consolidation of each layer, polishing operations comprising lapping, grinding, chemical-mechanical planarization, flame polishing, buffing, or the like, may be conducted on the new surfaces to manufacture final forms that have a smooth finish.

In another embodiment, the laser consolidation may be used in conjunction with other machining processes to create a textured surface that can improve the aerodynamic efficiency. While the laser consolidation can be used to develop a bulge on the platform, other processes such as electro-discharge machining, electrochemical machining, laser ablation, water jet cutting, or the like, can be used to create bowls (recesses) in the platform. Bowls, like bulges can also have a regular geometry or an irregular geometry. Texturing can therefore also be accomplished by creating a plurality of bulges and bowls on the surface of the turbine rotor or stator.

In one embodiment, the endwall contour modification via laser modification or a combination of processes that include laser modification may change the volume of the turbine blade or the platform by an amount of 0.005 volume percent (vol %) to about 50 vol % if desired. In another embodiment, the endwall contour modification may change the volume of the turbine blade or the platform by an amount of 0.5 volume percent (vol %) to about 10 vol % if desired. In yet another embodiment, the endwall contour modification may change the volume of the turbine blade or the platform by an amount of 1 volume percent (vol %) to about 5 vol % if desired. In one exemplary embodiment, the net change in volume can be an increase in volume. In another exemplary embodiment, the net change in volume can be a decrease in volume.

In one embodiment, the endwall contour modification will improve aerodynamic efficiency by about 0.1 to about 5% over turbine rotors that do not have the endwall contour modification. Within this range, endwall contour modification will improve aerodynamic efficiency by about 0.2 to about 2% over turbine rotors that do not have the endwall contour modification.

Laser consolidation has many advantages. As noted above, aerodynamic efficiency can be increased and surface heating can be decreased. In addition, this technique can be used at any stage of manufacturing to modify the endwall contour. For example, this technique can be used during preliminary stages of manufacturing the turbine rotor. Alternatively, it can be used just prior to assembly of the turbine blade with the platform. In an exemplary embodiment, it can be used on turbine rotors that have been in service for lengthy periods of time. When the turbine rotor is taken out of operation for servicing, the endwall contours can be advantageously modified to provide improved performance than that which was hitherto obtained. In addition to rotary blades and platforms, the method of laser consolidation can be advantageously applied to modify other parts of turbines such as, for example, seals, shrouds, splitters, stationary nozzles or stationary blades, or the like. These other parts may be modified either immediately after casting (i.e., when brand new) or when existing parts are taken out of operation for maintenance.

This method can also advantageously be used on various materials or composites. Modifications to the turbine rotor can be accomplished by the use of functionally graded materials. A functionally graded material is one that comprises different layers wherein each layer can provide different capabilities to the structure. For example, a first layer can provide heat transfer while a second layer has a high flexural modulus at elevated temperatures, thereby providing strength to the modification.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method of modifying a pre-existing contour of an end wall in a component comprising an airfoil coupled to a platform, wherein the end wall extends between the airfoil and the platform, the end wall contour modification method comprising:
creating a weld pool using a laser, wherein the weld pool is created on the component, and wherein the weld pool comprises molten metal or ceramic derived as a result of a heat interaction between the laser and the component;
adding a powder or a wire filler to the weld pool, wherein the powder or wire filler is a metal or ceramic; and
forming one or more bulges on the platform of the component using the powder or wire filler added to the weld pool, wherein the one or more bulges modify the pre-existing contour of the end wall.

2. The end wall contour modification method of claim 1, wherein the component is a part of a turbine, a compressor, a fan, an exhaust nozzle, a shroud, or a splitter.

3. The end wall contour modification method of claim 1, wherein the component comprises a turbine blade.

4. The end wall contour modification method of claim 1, wherein the component comprises a stator vane, and wherein the platform comprises an inner or outer band of the stator vane.

5. The end wall contour modification method of claim 1, wherein the powder added to the weld pool comprises a ceramic powder comprising alumina, zirconia, silica, yttria, magnesia, calcia, ceria, or any combination thereof.

6. The end wall contour modification method of claim 1, wherein the powder or wire filler added to the weld pool comprises a superalloy.

7. The end wall contour modification method of claim 1, further comprising forming at least bowl on the component.

8. The end wall contour modification method of claim 7, further comprising utilizing electro-discharge machining, electro-chemical machining, laser ablation, water jet cutting, to form the at least one bowl on the platform of the component.

9. The end wall contour modification method of claim 7, wherein the at least one bowl has a regular geometry.

10. The end wall contour modification method of claim 1, further comprising using the powder or the wire filler added to the weld pool to create a textured surface on the component.

11. A method of modifying a pre-existing contour of an end wall in a component comprising an airfoil coupled to a platform, wherein the end wall extends between the airfoil and the platform, the end wall contour modification method comprising:
creating a weld pool using a laser, wherein the weld pool is created on the component, and wherein the weld pool comprises molten metal or ceramic derived as a result of a heat interaction between the laser and the component;
adding a powder or a wire filler to the weld pool, wherein the powder or wire filler is a metal or ceramic;
forming one or more bulges on the platform of the component using the powder or wire filler added to the weld pool, wherein the one or more bulges modify the pre-existing contour of the end wall;
scanning the platform and the laser relative to each other while adding the powder or wire filler to the weld pool; and
solidifying the weld pool and the powder or the wire filler to form a clad track on the platform.

12. The end wall contour modification method of claim 11, further comprising:
   forming at least one layer of the one or more bulges by depositing successive clad tracks side-by-side.

13. The end wall contour modification method of claim 12, wherein the at least one layer is formed of functionally graded material.

14. The end wall contour modification method of claim 1, wherein the one or more bulges has a regular geometry.

15. The end wall contour modification method of claim 14, wherein the one or more bulges has a cross-section that is substantially circular, substantially triangular, substantially square, substantially rectangular, or substantially polygonal.

16. The end wall contour modification method of claim 1, wherein the one or more bulges has an irregular geometry.

17. The end wall contour modification method of claim 1, wherein the one or more bulges is spherical, hemispherical, inverted hemispherical, cylindrical, inverted cylindrical, tubular, conical, inverted conical, cuboidal, inverted cuboidal, ellipsoidal, inverted ellipsoidal, platelet-like, or any combination thereof.

* * * * *